Figure 2:
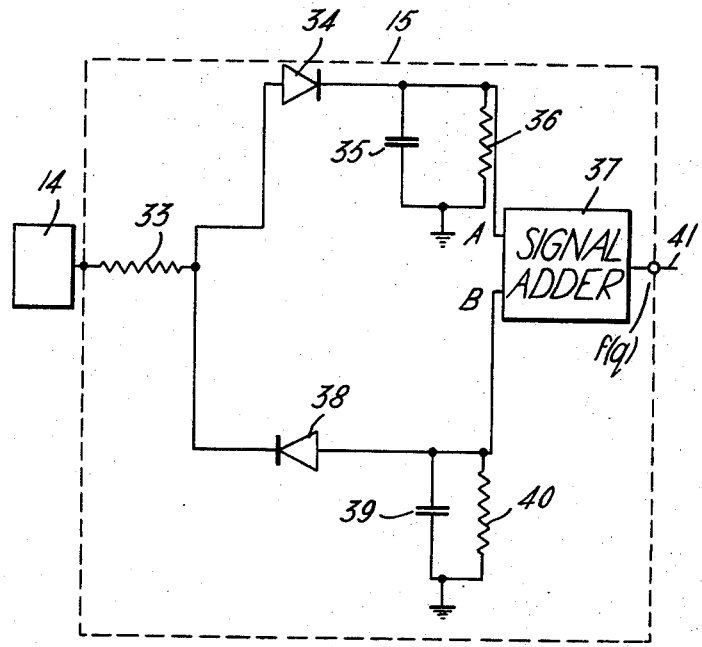

Aug. 4, 1964 J. A. D. GORHAM ETAL 3,143,319
APPARATUS FOR THE CONTROL OF AN AIRCRAFT'S SPEED
Filed Feb. 26, 1960 3 Sheets-Sheet 1

INVENTORS:
J.A.D. GORHAM &
R.C.F. LEGG.
BY: Munn & Hall
ATTORNEYS.

Aug. 4, 1964 J. A. D. GORHAM ETAL 3,143,319
APPARATUS FOR THE CONTROL OF AN AIRCRAFT'S SPEED
Filed Feb. 26, 1960 3 Sheets-Sheet 3

INVENTORS:
J.A.D. GORHAM
R.C.F. LEGG
BY: Moore of Hall
ATTORNEYS.

United States Patent Office 3,143,319
Patented Aug. 4, 1964

3,143,319
APPARATUS FOR THE CONTROL OF AN
AIRCRAFT'S SPEED
John Anthony David Gorham and Reginald Charles
Frank Legg, Bishops Cleeve, Cheltenham, England, assignors to Smiths America Corporation, Lakeland, Fla.
Filed Feb. 26, 1960, Ser. No. 11,299
21 Claims. (Cl. 244—77)

The present invention relates to apparatus for the control of the speed of an aircraft by variation of the propulsive thrust applied to it.

It is known that the speed of an aircraft is affected not only by the propulsive thrust applied to it, but also by its attitude in pitch. For example, it will be appreciated that, if the nose of an aircraft is raised, it will usually be necessary to increase the propulsive thrust if the airspeed is to be maintained constant.

It is accordingly an object of the present invention to provide apparatus for the control of the speed of an aircraft by variation of the propulsive thrust applied to it, wherein the effects of variation in pitch attitude are counteracted.

According to the present invention, therefore, there is provided apparatus for the control of the speed of an aircraft comprising means for generating a first signal in accordance with any deviation of the aircraft's speed from a datum value, means for generating a second signal dependent upon the rate of pitch of the aircraft about its body axes and means for varying the propulsive thrust applied to the aircraft independence upon the sum of the first and second signals.

Preferably the apparatus also includes means for generating a further signal which is the integral with respect to time of either the first signal or the sum of the first and second signals and means for applying the further signal to said thrust varying means which is arranged to vary said thrust in dependence upon the sum of the first, second and further signals.

Where the propulsive thrust is generated by one or more internal combustion engines, the thrust varying means may conveniently comprise means for varying the setting of the throttles (or equivalent controls) for controlling the fuel supply to the engines.

The second signal is preferably derived from a signal proportional to the rate of pitch of the aircraft by passing it through a filter having substantially the following properties: the output is the algebraic sum of signals A and B, signal A originating from positive inputs and itself being positive, signal B originating from negative inputs and itself being negative, signal A following the input with a simple lag while the input exceeds A and decaying exponentially while the input is less than A, and signal B being derived similarly from negative inputs.

Such a filter will be referred to hereinafter as "a filter as specified."

Preferably the time constants for the lags associated with signals A and B are equal, as are the time-constants of the exponential decays associated respectively with those two signals.

Figure 3:
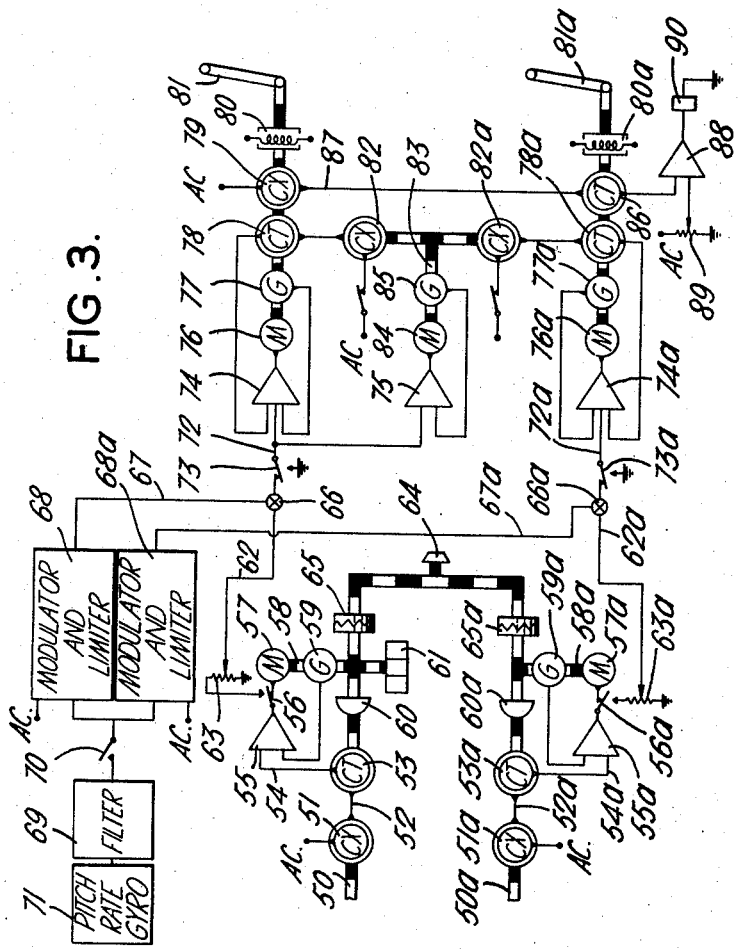

Examples of apparatus according to the present invention will now be described with reference to the accompanying drawings in which:

FIGURE 1 shows a block schematic diagram of apparatus for a four engined aircraft, FIGURE 2 shows a circuit diagram of a filter as specified, and FIGURE 3 shows a block schematic diagram of apparatus for a twin engined aircraft.

In FIGURES 1 and 3 of the drawings, thin connecting lines between blocks indicate flow of information by electrical signals, and thick chequered lines mechanical connections. There is also some duplication of elements of the apparatus described and elements having references which are a number followed by a letter are identical with those having the number alone as a reference.

Referring now to FIGURE 1, pressure lines 1 and 2 which are connected to a conventional pressure head 43 (indicated only as a block in the drawings) arranged to give the usual pitot and static pressures, are connected to a computing device 42 which derives by conventional methods an electric signal representing the deviation of the airspeed of the aircraft from a datum value. This signal appears on the output line 3 and the datum can be set by means of a knob 16 which can be coupled to the computing device 42 when required by engagement of the clutch 17. A conventional mechanical counter 18 which is driven by a shaft from the computing device 42, indicates the magnitude of the datum. A second signal representing the deviation of the airspeed of the aircraft from the datum appears on the output line 3a, this signal being separately generated within the computing device 42 by identical apparatus, so that the signals appearing on the two output lines 3 and 3a are nominally identical. For example, where the lines 1 and 2 are coupled to a conventional pressure capsule, separate electrical pick-offs may be provided, each associated with a separate computing circuit for generating the signal for the respective one of the lines 3 and 3a. The output line 3 is connected to one input of a signal adding device 4 and also to one fixed contact 9 of a two-position changeover switch 10. The connections to the line 3a are similar and will not be described in detail below.

A spring restrained gyroscope 14 which is mounted on the aircraft so as to be responsive to the aircraft's rate of pitch about its body axes, generates a D.C. electrical signal which represents the rate of pitch and is applied to a filter 15, that being a "filter as specified," as defined earlier in this specification. The output from this filter 15 is applied over a line 41 to the second input of the signal adding device 4. The output of the adding device 4, which is the algebraic sum of the signals applied to it from lines 3 and 41, is applied to one fixed contact 5 of a further changeover switch 6, which is ganged to the switch 10 as indicated in the drawing by the broken line 11. The moving contact of the switch 6 is connected through one winding of a comparator device 7 to the inputs of identical servo amplifiers 8 and 8a which form part of separate servo control systems for the throttles of two of the aircraft's four engines.

The moving contact of the switch 10 is connected to the input of conventional electro-mechanical integrator 12 which is arranged to operate so as to rotate an output shaft 13 through an angle proportional to the integral with respect to time of any electrical signal applied to its input. The shaft 13 is connected to one input of a mechanical adding and subtracting device 19.

The second output line 3a from the computing device 42 is connected to apparatus identical with that to which the output line 3 is connected, a second rate gyroscope 14a being included to provide a second independent source of signals representing the aircraft's rate of pitch. The output from the signal adding device 4a is applied through the switch 6a and the other winding of the comparator device 7 to the inputs of servo amplifiers 8b and 8c forming part of separate servo control systems for the throttles of the other two engines of the aircraft. In addition the output shaft 13a of the integrator 12a is connected to the second input of the adding and subtracting device 19. The device 19 operates in known manner to combine the mechanical signals applied to its two inputs to rotate a difference output shaft 20 in accordance with the difference of the signals applied to its inputs and a sum output shaft 21 in accordance with the sum. It may for example comprise two differential gears, both coupled to be driven from the same two input shafts, the relative senses of the drives to the two gears being arranged differently so that the output shafts of the two gears are rotated in accordance with the sum and the difference of the inputs respectively.

The sum output shaft 21 of the device 19 drives four similar electrical position pick-offs 22, 22a, 22b and 22c. The electrical signal generated in the pick-off 22 is applied to a second input of the servo amplifier 8 and the signals generated by the other pick-offs 22a–c are similarly applied to second inputs of the corresponding ones of the servo amplifiers 8a–c. The signals generated by the pick-offs 22–22c are nominally identical and are in accordance with the integral with respect to time of the deviation of the aircraft's speed from the datum value.

The difference output shaft 20 of the device 19 is coupled to a rate signal generator 29 which operates to generate an electric signal in accordance with the rate of rotation of the shaft 20. Similarly the comparator 7 generates an electric signal in accordance with the difference between the outputs of the signal summing devices 4 and 4a which pass through its windings. The signals generated by the device 7 and generator 29 are duplicated and are applied to separate inputs of an indicating and control unit 30 which includes duplicate circuits and mechanisms, arranged in known manner to provide a warning indication if the signals generated by either of the devices 7 and 29 exceeds a pre-determined value, i.e. if there is a fault condition giving rise to too great a discrepancy between the signals in the two halves of the system. The unit 30 can also be arranged as desired to include cut out switches and other protective circuits and warning devices as may be required by individual circumstances. It will be appreciated however, that the inclusion of the control unit 30 and its operation are optional matters which form no part of the present invention.

The servo control systems for the four throttles of aircraft are identical and only that associated with the servo amplifier 8 will be described here. The output of the amplifier 8 is applied to a conventional servomotor 23 which drives a tachometer generator 24, and a gear box 25 (having a step-down ratio of N:1). The output shaft of the gear box 25 drives a position pick-off 26 and the driving member of an electrically controlled clutch 27, the driven member of which is coupled to the throttle setting lever 28 of the engine concerned. An electrical signal representing the rate of rotation of the output shaft of the motor 23 is fed back to an input of the amplifier 8 from the generator 24 as is a signal representing the position of the throttle lever 28 from the pick-off 26, these constituting in known manner rate and position feed-back signals respectively.

It will thus be seen that each of the servo systems has applied to it in operation a demand signal which is a combination of a signal representing the deviation of the aircraft's airspeed from a datum, a signal which is a function of the aircraft's rate of pitch and lastly a signal representing the integral with respect to time of the deviation of the aircraft's airspeed from the datum. The throttle levers 28 and 28a are those of the two outboard engines of the aircraft and the levers 28b and 28c are those of the throttles of the two inboard engines. The first two components of the demand signals for the outboard engines are derived from the same sources, namely the output line 3 of the computing device 42 and the pitch rate gyroscope 14, whilst those components for the two inboard engines are derived from the output line 3a and the pitch rate gyroscope 14a respectively. The third components, the integral signals, are derived in each case by separate pick-offs from a given source which is itself coupled to both the output lines 3 and 3a of the computing device 42.

On changeover of the ganged switches 6, 6a, 10 and 10a, the connections between the signal adding devices 4 and 4a and the servo amplifiers 8–8c are broken, whilst the inputs to the integrators 12 and 12a are connected to input lines 31 and 31a respectively, these being connected to the fixed contacts 32 and 32a of the switches 10 and 10a. The purpose of these switches and the nature of the signals applied to the input lines 31 and 31a, from the associated control signal sources 44 and 44a to which they are connected will be described below.

FIGURE 2 of the accompanying drawing shows the circuit of an example of a filter as specified, which circuit may be used in the filters 15 and 15a of FIGURE 1. Referring now to FIGURE 2 which will be assumed to show the circuit of the filter 15, it will be seen that the output line of the pitch rate gyroscope 14 is connected within the filter 15 to one terminal of a resistor 33. The other terminal of the resistor 33 is connected in common to unlike poles of rectifier diodes 34 and 38. The other pole of the diode 34 is connected to one input A of an adding circuit 37, a capacitor 35 and a resistor 36 being connected in parallel across this connection and earth. Similarly, the other pole of the diode 38 is connected to a second input B of the adding circuit 37, a capacitor 39 and a resistor 40 being connected in parallel across this connection and earth. The adding circuit 37 has a single output which is the output of the filter 15 and is connected to the line 41. The diodes 34 and 38 are nominally identical as are the capacitors 35 and 39 and the resistors 36 and 40. The signals applied to the inputs A and B of the adding circuit 37 are respectively the signals A and B of the definition of filters are specified given earlier in this specification.

If the D.C. output signal from the gyroscope 14 is positive with respect to earth, and exceeds the value of signal A, the diode 34 will conduct and the capacitors 35 will charge through the resistor 33. If, on the other hand the signal is positive and less in magnitude than the signal A, the diode 34 will not conduct and the signal A will decay due to the capacitor 35 discharging through the resistor 36. Similarly if the output signal from the gyroscope 14 is negative and exceeds (in the negative direction) the magnitude of the signal B, the diode 38 will conduct, thus allowing the capacitor 39 to charge negatively through the resistor 33. If, however, the output signal from the gyroscope is less negative than the signal B, the diode 38 will be non-conducting and the signal B will decay as the capacitor 39 discharges through the resistor 40. It will be appreciated, further, that the diode 34 is always non-conducting when the output of the gyroscope is negative and that the diode 38 is always non-conducting when it is positive, so that the signals A and B also decay as described when the input signal is negative or positive respectively. In a typical case, the time constant for the charging circuits may be 0.25 sec. and for the decay circuits 10 secs.

During normal flight conditions, the effect of the filters as specified, i.e. filters 15 and 15a, whether having circuits as shown in FIGURE 2 or not, will be to ensure that signals generated by the gyroscopes 14 and 14a are modified so that to a substantial extent they are unaffected by transient disturbances of the aircraft due to turbulence and like causes, thus ensuring that these signals do not cause unnecessary and undesirable movement of the engine throttles. On the other hand, if a large pitch rate signal of either sense is generated by the gyroscopes 14 and 14a, the signals appearing on the lines 41 and 41a will come into correspondence with it with relatively little delay so that the appropriate corrective throttle movement will be made rapidly.

The manner of functioning of the apparatus in normal flight conditions will be readily apparent. Each throttle will be positioned in accordance with the sum of the signals applied to the servo control system provided for it, that is in accordance with the signals representing the deviation of its airspeed from the datum value set by the knob 16, a function of the aircraft's pitch rate, as represented by the output of the appropriate one of the filters 15 and 15a, and the integral with respect to time of the deviation of the airspeed from the datum value, the throttle position being such as to reduce the deviation towards zero. In this manner the adjustment of the throttles takes account of both changes in airspeed and changes in pitch attitude.

It will be seen that, when the aircraft enters a turn, the resulting rate of turn about the aircraft pitch axis (since the pitch rate gyro is fixed in the aircraft which, in the case of a conventional aircraft, will be banked during the turn, and will therefore give a signal representing the component about the aircraft's pitch axis of its rate of turn about a vertical axis in space) will cause gyroscope 14 to produce a signal giving an increased throttle opening in the early part of the turn, which is somewhat desirable.

The apparatus, by changing over the switches 6, 6a, 10 and 10a can be used during the final stages of a landing manoeuvre, the flare-out, to control the throttles of the aircraft engines so that they close at a substantially uniform rate until they attain a position corresponding to ground idling. To this end, the control signal sources 44 and 44a, forming part of an instrument landing system, apply a predetermined D.C. potential to lines 31 and 31a. This is applied to the inputs of the integrators 12 and 12a, resulting in the application of a steadily varying potential to the inputs of the amplifiers 8–8c. The other inputs of the amplifier 8–8c having been disconnected by the switches 6 and 6a, these potentials will result in closure of the throttles at a uniform rate, determined by the magnitudes of the control potentials from the sources 44 and 44a, as required.

In a modification of the apparatus described with reference to FIGURE 1, the signals appearing on the lines 41 and 41a may be fed to second inputs of the integrators 12 and 12a respectively. In this manner, a signal dependent on the integral with respect to time of the aircraft's pitch rate will also be applied to the servo amplifiers 8–8c. The result of this is as follows. During a turn, as explained above, the pitch rate gyro will give an output signal. If the aircraft's rate of turn is constant, as will be assumed here, this signal will have a small constant value. In the unmodified system, the effect of the integrator 12 is to eliminate any constant difference between the aircraft's actual air speed and the datum air speed set by the knob 16 which may arise from any datum errors occurring in the system. If then, as in the modified system, the pitch rate signal arising during a turn is also applied to the integrator 12 this will have the same effect as an increase in the setting of the datum air speed value, as determined by the setting of the knob 16, with the result that the actual air speed will be controlled throughout the turn to be equal to a value slightly greater than that set by the knob 16. This may be advantageous if it is desired to ensure a safe margin above the stall.

It will be appreciated that the manner in which the two integrators 12 and 12a are used to generate the required integral control signal for the servo amplifiers, is in fact of general application to cases in which it is required to use at least two, largely independent, channels to control a common output, i.e. the propulsive thrust in the particular case considered in this application. If completely independent integrators are used for the two channels (i.e. if the outputs of integrators 12 and 12a were not combined but applied separately each to two of the servo amplifiers), they might and probably would drift in opposite directions, particularly if the input signals sources did not give equal signals. This would result at first in an increasing and undesirable discrepancy between the outputs provided by the two channels and, eventually if and when the two integrators reached their limits, an effective loss of the integral control term. This is avoided in cases such as the present one in which the outputs of the two integrators are added, the provision of the difference output of the device 19, together with the detector circuits associated with it providing adequate warning should either integrator fail to operate correctly.

In an alternative arrangement which will be described as applied to the control of the airspeed of a twin-engined aircraft, a single integrator is used, its output being applied to inputs of the servo control systems for both throttles. In addition, the integrator is fed with signals which are the sum of the signals representing the deviation of the airspeed from the datum value and the signals dependent on the aircraft's pitch rate. This alternative apparatus is shown in FIGURE 3 of the accompanying drawings.

Referring now to FIGURE 3, input shafts 50 and 50a are each driven in operation by apparatus (not shown) so that their angular positions represent the airspeed of the aircraft. The apparatus may, for example, be similar to the computing device 42 shown in FIGURE 1, having pressure lines connecting it to pressure heads for deriving the usual pitot and static pressures, pressure capsules for producing movements dependent on the difference between the pitot and static pressures and mechanical linkages for converting these movements into the rotations of the shafts 50 and 51. The shafts 50 and 50a drive the rotors of synchro control transmitters 51 and 51a, these being fed from an alternating current voltage supply in the normal manner (as indicated in FIGURE 3 by connection of the rotor leads to a terminal labelled A.C.). As the system is a synchronous A.C. signal operated system, similarly labelled terminals are shown at those places in FIGURE 3 where they are required in known manner, but will not be specifically mentioned in this description. Electric signals representing the airspeed of the aircraft are thus transmitted over the three core lines 52 and 52a connecting the stators of the transmitters 51 and 51a to the stators of synchro control transformers 53 and 53a. As the transformers 53 and 53a each form part of almost identical arrangements, only that associated with the transformer 53 will be described in detail. The voltage generated in the rotor of the transformer 53 is applied over a twin core lead 54 to the input of a servo amplifier 55, the output of which is connected to the moving contact of a two position relay contact 56. Contact 56 is shown in FIGURE 3 in its position when the relay is un-operated and in this position connects the output of the amplifier 55 to a servo motor 57. The output shaft 58 of the motor 57 drives a tachometer generator 59, the voltage generated by which is fed back to a second input of the amplifier 55. The shaft 58 is coupled to the rotor of the transformer 53 through a cam 60 and also drives a three digit mechanical counter 61 arranged to register the aircraft's airspeed. (There is no counter 61a coupled to shaft 58a of the arrangement associated with the transformer 53a.)

It will be seen that with contacts 56 and 56a in the position shown in FIGURE 3, the control transformers 53 and 53a are connected in a position servo loop such that their rotors are always in a position corresponding to the magnitudes of the airspeed represented by the signals applied to them over the leads 52 and 52a. If the contacts 56 and 56a are changed over from the position shown in FIGURE 3, the outputs of the amplifiers 55 and 55a then being applied to output lines 62 and 62a through potentiometers 63 and 63a, the magnitude of the airspeed at the moment of switching will serve as a datum and the signals produced by the amplifiers 55 and 55a will represent any departure of the airspeed from that datum. If required, this datum value, which is indicated by the counter 61, can be changed for both channels by adjustment of the control knob 64 after engagement of the clutches 65 and 65a, the latter then serving to couple the control knob 64 to the rotors of the transformers 53 and 53a through the cams 60 and 60a. The shaping of the cams 60 and 60a is, in fact, determined so that there shall be a linear relation between the movement of the knob 64 and the variation of the datum airspeed which that movement causes.

The output lines 62 and 62a are connected respectively to first inputs of signal adding devices 66 and 66a, each of which has a second input which is connected by a line 67 or 67a respectively to a source of signals representing a function of the rate of pitch of the aircraft about its body axes. The lines 67 and 67a are connected to the outputs of modulators and limiters 68 and 68a (the modulators are required to convert the signals to A.C. signals in conformity with the other electrical signals), the inputs of which are connected together to the output of a filter 69 through a further contact 70 of the relay of which contacts 56 and 56a are part. Contact 70 is closed only when the relay is energised, that is to say when the contacts 56 and 56a are in the other position to that shown in FIGURE 3. The filter 69 is a filter as specified, as defined earlier in this specification, the input of which is coupled to the output of a spring restrained gyroscope 71 which is mounted in the aircraft so as to permit the generation of signals representing the aircraft's pitch rate. The circuit of filter 69 may for example be that shown in FIGURE 2. The output of the signal adding device 66 is connected by a line 72 which includes a contact 73 of a second relay, to one input of a servo amplifier 74 and to one input of an integrating amplifier 75. The output of the adding device 66a is similarly connected, except for the omission of the connection to the integrating amplifier 75. The contacts 73 and 73a are shown in the position they take up when the second relay is not operated and, as is shown in the diagram, they connect the inputs of the amplifiers 74, 74a and 75 to earth, when the relay is energised.

The amplifiers 74 and 74a are servo amplifiers forming part of servo control systems for positioning the two throttles of the aircraft. These systems are in many respects identical so that only that associated with the amplifier 74 will be described in detail. This includes a servo motor 76 coupled to the output of the amplifier 74, the output shaft of the motor 76 driving a tachometer generator 77, the signal generated by which is fed back to a further input of the amplifier 74. The output shaft of the motor 76 also drives the rotors of a control transformer 78 and a control transmitter 79 (the purpose of these last two items will become apparent shortly) and the driving member of an electro-magnetic clutch 80. The driving member of the clutch 80 is coupled to the throttle lever 81 of the port engine of the aircraft.

The control transformers 78 and 78a, the rotors of which are driven by the output shafts of the servo motors 76 and 76a, each feed signals from their rotors back to further inputs of the servo amplifiers 74 and 74a respectively. Their stators are fed with signals from the stators of synchro-control transmitters 82 and 82a, the rotors of which are fed with an alternating current voltage and are positioned by a common shaft 83 which is the output shaft of a servo motor 84, the latter being coupled to the output of the integrating amplifier 75. The output shaft of the motor 84 also drives a tachometer generator 85, the signal generated by which is fed back to a second input of the amplifier 75, this feed-back of a signal representing the rate of change of the output of the amplifier 75 determining its integrating function in known manner.

The signals fed to the stators of the control transformers 78 and 78a thus represent the integral of the signal fed to the first input of the servo amplifier 74. These, together with position signals due to rotation of the rotors by the motors 76 and 76a are fed back to a third input of the respective ones of the amplifiers 74 and 74a.

Instead of the control transmitter 79 in the servo system associated with the amplifier 74, that associated with the amplifier 74a has a control transformer 86, the rotor of which is positioned by the output shaft of the motor 76a. The rotor of the transmitter 79 is fed with an alternating current voltage and the stators of the transmitter 79 and transformer 86 are connected by a three core lead 87. The output voltage from the rotor of the transformer 86 is fed to one input of a comparator amplifier 88, the other input of which is fed with a predetermined voltage derived from a potentiometer 89 connected across a source of alternating current voltage. The comparator 88 is arranged to energise the winding of warning relay 90 if the difference between the signals applied to its input exceeds a predetermined value. This can only happen if the positions of the output shafts of the servo motors 76 and 76a differ by an amount giving rise to the generation of a voltage in the rotor of the transformer 86 greater than the voltage determined by the setting of the potentiometer 89.

The operation of the apparatus shown in FIGURE 3 is very similar to that of the apparatus shown in FIGURE 1. Each of the throttle levers is positioned by its associated servo system in accordance with a demand signal which is the sum of a first signal representing the deviation of the aircraft's airspeed from a datum value (the signals on lines 62 and 62a), a second signal which is dependent on the aircraft's pitch rate (the signals on lines 67 and 67a) and a further signal which is the integral of the sum of the first and second signals (the output of control transmitters 82 and 82a). The further signal is derived by a single integrator from the sum of the first and second signals in one of the channels.

It will be appreciated that whilst the apparatus described with reference to FIGURE 1 utilises D.C. electrical signals and mechanical signals and that described with reference to FIGURE 3 utilises A.C. electrical signals and mechanical signals, the particular forms of signals which may be employed, is not limited to these forms and that equivalent systems may be used where required to control the throttle levers of the aircraft in the desired manner. Further, the various elements of the apparatus may take any known and convenient form, for example the amplifiers may be either thermionic valve or magnetic amplifiers.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:
1. Apparatus for the control of the speed of an aircraft which has means for applying a propulsive thrust to the aircraft and means for varying the magnitude of said thrust, the apparatus comprising means for generating a first signal in accordance with any deviation of the aircraft's speed from a datum value, means for generating a second signal dependent upon the rate of pitch of the aircraft, control means for actuating said thrust varying means and means for applying said first and second signals additively to said control means, the control means being adapted to respond to the sum of said applied signals to actuate said thrust varying means to vary the propulsive thrust in the manner required to reduce said deviation towards zero.

2. Apparatus according to claim 1 in which said control means comprises a servo control system for controlling said thrust varying means, the servo control system having a demand signal input to which said first and second signals are applied.

3. Apparatus according to claim 2 for an aircraft having an engine for applying a propulsive thrust thereto and a control member for varying the magnitude of said thrust, said servo control system being a position control system for varying the position of the control member in accordance with the sum of said first and second signals to reduce said deviation towards zero.

4. Apparatus according to claim 1 in which the first signal generating means includes a pressure head for pitot and static pressures, means responsive to said pressures for generating an electric signal representing the aircraft's speed, datum speed setting means and means for generating an electric signal representing the deviation of the speed from the datum value set on the setting means.

5. Apparatus according to claim 1 in which the second signal generating means includes a spring restrained gyroscope mounted in the aircraft to precess about an axis in opposition to said spring restraint in response to pitching and means for generating a signal in response to precession of the gyroscope about said axis.

6. Apparatus for the control of the speed of an aircraft which has means for applying a propulsive thrust to the aircraft and means for varying the magnitude of said thrust, the apparatus comprising means for generating a first signal in accordance with any deviation of the aircraft's speed from a datum value, means for generating a second signal dependent upon the aircraft's rate of pitch, integrating means coupled to said first signal generator for generating a further signal which is the integral with respect to time of said first signal, control means for actuating said thrust varying means and means for applying said first, second and further signals additively to said control means, the control means being adapted to respond to the sum of said applied signals to actuate said thrust varying means to vary the propulsive thrust in the manner required to reduce said deviation towards zero.

7. Apparatus according to claim 6 in which said control means comprises a servo control system for controlling said thrust varying means, the servo control system having a demand signal input to which said first and second signals are applied.

8. Apparatus according to claim 7 for an aircraft having an engine for applying a propulsive thrust thereto and a control member for varying the magnitude of said thrust, said servo control system being a position control system for varying the position of the control member in accordance with the sum of said first, second and further signals to reduce said deviation towards zero.

9. Apparatus according to claim 6 in which the first signal generating means includes a pressure head for pitot and static pressures, means responsive to said pressures for generating an electric signal representing the aircraft's speed, datum speed setting means and means for generating an electric signal representing the deviation of the speed from the datum value set on the setting means.

10. Apparatus according to claim 6 in which the second signal generating means includes a spring restrained gyroscope mounted in the aircraft to precess about an axis in opposition to said spring restraint in response to pitching and means for generating a signal in response to precession of the gyroscope about said axis.

11. Apparatus for the control of the speed of an aircraft which has means for applying a propulsive thrust to the aircraft and means for varying the magnitude of said thrust, the apparatus comprising means for generating a first signal in accordance with any deviation of the aircraft's speed from a datum value, means for generating a second signal dependent upon the rate of pitch of the aircraft, integrating means, means for applying said first and second signals additively to said integrating means to generate a further signal which is the integral with respect to time of the sum of the first and second signals, control means for actuating said thrust varying means and means for applying said first, second and further signals additively to said control means, the control means being adapted to respond to the sum of said applied signals, to actuate said thrust varying means to vary the propulsive thrust in the manner required to reduce said deviation towards zero.

12. Apparatus for the control of the speed of an aircraft which has an even number of internal combustion engines for applying a propulsive thrust to the aircraft and separate means for varying the magnitude of the thrust applied by each said engine, the apparatus comprising first and second means each for independently generating a first signal in accordance with the deviation of the aircraft's speed from a datum value, means for generating a second signal dependent on the aircraft's rate of pitch, separate control means associated with each said thrust varying means to actuate it, means for applying said second signal and the first signal generated by the first of said means additively to the control means associated with the thrust varying means of half the number of engines, means for applying said second signal and the first signal generated by the second of said means additively to the control means associated with the thrust varying means of the other half of the engines, each said control means being adapted to respond to the sum of the signals applied to it to actuate the associated thrust varying means to vary the propulsive thrust of the engine concerned in the manner required to reduce said deviation towards zero.

13. Apparatus according to claim 12 which further includes integrating means, means for applying the first signal generated by one of said first and second means and said second signal additively to said integrating means to generate a further signal representing the integral with respect to time of the sum of the signals applied to it and means for applying said further signal to each said control means in addition to the other signals applied to them.

14. Apparatus according to claim 12 which further includes first and second integrating means, means for applying the first signals generated by said first and second means respectively to said first and second integrating means respectively to generate output signals representing the integrals with respect to time of the first signals, combining means coupled to said integrating means to generate a further signal which is the sum of said output signals, and means for applying said further signal to each said control means in addition to the other signals applied to them.

15. The combination set forth in claim 12, said internal combustion engines comprising pairs of engines symmetrically disposed about the roll axis of said aircraft, each said half the number of engines comprising at least one of said pairs.

16. The combination set forth in claim 5, second signal generating means comprising a filter circuit having input and output terminals and also having first circuit means comprising input and output terminals, the input terminals of the first circuit means being coupled to the input terminals of the filter circuit and said first circuit means being responsive to positive-going signals applied to its input terminals to generate an output signal following the input signal with a simple lag as long as the input signal is more positive than the output signal but to decay exponentially if the input signal is less positive than the output signal, second circuit means including input and output terminals, the input terminals of the second circuit means being coupled to the input terminals of the filter circuit and said second circuit means being responsive to negative-going signals applied to its input terminals to generate an output signal following the input signal with a simple lag as long as the input signal is more negative than the output signal but to decay exponentially if the input signal is less negative than the output signal, and means for combining the signals appearing at the output terminals of said first and second circuit means and for applying the combined signals to the output terminals of the filter circuit.

17. Apparatus acording to claim 16 in which said first and second circuit means each comprises a resistor and a capacitor connected in parallel across its output terminals and a diode connected between one input terminal of the circuit means and one input terminal of the resistor and capacitor, the diodes being connected in opposite senses in the two circuit means whereby the capacitor in the first circuit means can be charged only by positive-going signals and the capacitor in the second circuit means can be charged only by negative-going signals.

18. Apparatus according to claim 10, in which the second signal generating means further includes a filter circuit, means for applying said precession response signal to the input of a filter circuit and means for deriving said second signal from the output of the filter circuit, the filter circuit having input and output terminals and also having first circuit means comprising input and output terminals, the input terminals of the first circuit means being coupled to the input terminals of the filter circuit and the said first circuit means being responsive to positive-going signals applied to its input terminals to generate an output signal following the input signal with a simple lag as long as the input signal is more positive than the output signal but to decay exponentially if the input signal is less positive than the output signal, second circuit means including input and output terminals, the input terminals of the second circuit means being coupled to the input terminals of the filter circuit and said second circuit means being responsive to negative-going signals applied to its input terminals to generate an output signal following the input signal with a simple lag as long as the input signal is more negative than the output signal but to decay exponentially if the input signal is less negative than the output signal, and means for combining the signals appearing at the output terminals of said first and second circuit means and for applying the combined signals to the input terminals of the filter circuit.

19. Apparatus according to claim 18 in which said first and second circuit means each comprises a resistor and a capacitor connected in parallel across its output terminals and a diode connected between one input terminal of the circuit means and one input terminal of the resistor and capacitor, the diode being connected in opposite senses in the two circuit means whereby the capacitor in the first circuit means can be charged only by positive-going signals and the capacitor in the second circuit means can be charged only by negative-going signals.

20. The combination set forth in claim 10, wherein said second signal generating means further includes a filter having an input connected to receive the precession response signal and an output for supplying said second signal, the filter comprising a pair of similar resistance-capacitance circuits each comprising resistive means connected in parallel with capacitive means, a first diode connected in a first sense between said input of the filter and one of said resistance-capacitance circuits, a second diode connected in a sense opposite to said first sense between said input of the filter and the other of said resistance-capacitance circuits, and signal adder means coupled to both of said resistance-capacitance circuits and providing the output of said filter.

21. Automatic piloting apparatus for controlling the speed of an aircraft which has two groups of engines for applying propulsive thrust to the aircraft, the engines of the two groups being symmetrically disposed about the roll axis of the aircraft and each engine having means for varying the magnitude of thrust applied thereby, the apparatus comprising two independent means each for generating a first signal dependent upon deviation of the aircraft speed from a datum value, two independent means each for generating a second signal dependent upon rate of pitch of the aircraft, two control means for actuating the thrust varying means of the engines of the two groups respectively, means for combining the first and second signals to apply to the two control means respectively two independent signal combinations each comprising an additive combination of first and second signals, each control means being adapted to respond to the signal combination it receives to actuate the thrust varying means in the manner required to reduce said speed deviation towards zero.

References Cited in the file of this patent

UNITED STATES PATENTS

| | | |
|---|---|---|
| 2,620,439 | Dome | Dec. 2, 1952 |
| 2,630,987 | Hauptman | Mar. 10, 1953 |
| 2,743,361 | Bauman | Apr. 24, 1956 |
| 2,799,461 | Anderson et al. | July 16, 1957 |
| 2,948,496 | Joline | Aug. 9, 1960 |
| 2,953,327 | Clement et al. | Sept. 20, 1960 |